United States Patent [19]
Powell

[11] Patent Number: 5,955,118
[45] Date of Patent: Sep. 21, 1999

[54] APPARATUS AND METHOD FOR MANUFACTURING TWISTED PRETZELS

[75] Inventor: Gary J. Powell, Frisco, Tex.

[73] Assignee: J & J Snack Foods Corp., Pennsauken, N.J.

[21] Appl. No.: 08/947,529

[22] Filed: Oct. 2, 1997

[51] Int. Cl.⁶ .................................................... A21C 3/08
[52] U.S. Cl. ........................... 425/323; 425/334; 425/391
[58] Field of Search .................................... 425/319, 323, 425/334, 391, 403.1, 140, 150; 426/500

[56] References Cited

U.S. PATENT DOCUMENTS

| | | |
|---|---|---|
| 223,917 | 1/1880 | Huber . |
| 277,573 | 5/1883 | Keller et al. . |
| 1,089,725 | 3/1914 | Schaetzel . |
| 1,127,967 | 2/1915 | Davis et al. . |
| 1,142,533 | 6/1915 | Schaetzel . |
| 1,397,233 | 11/1921 | Robbins . |
| 1,669,277 | 5/1928 | Barthold . |
| 1,739,892 | 12/1929 | Elliott . |
| 1,793,374 | 2/1931 | Reed . |
| 1,957,135 | 5/1934 | Fabian . |
| 2,026,526 | 1/1936 | Gripe . |
| 2,031,365 | 2/1936 | Gerland . |
| 2,053,608 | 8/1936 | Gerland . |
| 2,056,838 | 10/1936 | Elliott . |
| 2,057,772 | 10/1936 | Elliott . |
| 2,071,321 | 2/1937 | Adler . |
| 2,077,993 | 4/1937 | Elliott . |
| 2,090,291 | 8/1937 | Gipe . |
| 2,107,749 | 2/1938 | Curtis . |
| 2,114,951 | 4/1938 | Young et al. . |
| 2,161,267 | 6/1939 | Young et al. . |
| 2,210,864 | 8/1940 | Farmer . |
| 2,295,246 | 8/1942 | Weida . |
| 2,573,754 | 11/1951 | Young et al. . |
| 2,628,577 | 2/1953 | Gipe . |
| 2,629,340 | 2/1953 | Allen et al. . |
| 2,712,291 | 7/1955 | Groff . |
| 2,736,276 | 2/1956 | Gipe . |
| 2,739,544 | 3/1956 | Groff . |
| 2,747,523 | 5/1956 | Groff . |
| 2,769,407 | 11/1956 | Allen et al. . |
| 3,308,770 | 3/1967 | Groff . |
| 3,315,618 | 4/1967 | Groff . |
| 4,536,147 | 8/1985 | Groff . |
| 4,738,861 | 4/1988 | Blain et al. . |
| 5,099,910 | 4/1991 | Zwicker . |
| 5,702,732 | 12/1997 | Piller .......................................... 425/325 |

*Primary Examiner*—James P. Mackey
*Attorney, Agent, or Firm*—Quarles & Brady

[57] ABSTRACT

An twisted pretzel producing apparatus has a conveyor with a surface for receiving and transporting a rope of dough. An anvil engages the rope of dough so that continued conveyor movement form a curved dough portion. A twister assembly grabs the two ends of the rope of dough and rotates to form a twisted section of dough. The twister assembly includes a set of plungers that press the two ends against the curved portion to form a twisted pretzel. The exact location and degree to which the ends are pressed against the curved portion are randomly varied so that each pretzel has a different appearance as occurs with pretzels made by hand.

15 Claims, 5 Drawing Sheets

5,955,118

APPARATUS AND METHOD FOR MANUFACTURING TWISTED PRETZELS

FIELD OF THE INVENTION

The present invention relates to food processing equipment and more particularly to apparatus for manufacturing twisted pretzels.

BACKGROUND OF THE INVENTION

Pretzels were traditionally formed by hand rolling dough into a rope and then manually twisting and folding the rope over on itself to create the common twisted pretzel. Although there is a certain appeal to the unique appearance of handmade pretzels, as one is not identical to the other, the production of such food products is very labor intensive and involves operations which are very monotonous to workers. As a result, various types of equipment have been created to form pretzels automatically with minimal human intervention.

One of the drawbacks of automated pretzel forming equipment is that each individual pretzel is virtually indistinguishable from all of the other pretzels produced by that machine. As a consequence, the pretzels lack the unique individualized appearance of a handmade product. Although the automated machinery can produce large quantities of pretzels very rapidly, it is desirable to produce them in a manner in which the pretzels have a unique appearances resembling the handmade product.

SUMMARY OF THE INVENTION

The general object of the present invention is to provide an automated apparatus for forming twisted pretzels.

Another object is to provide such an automated apparatus that is capable of forming twisted pretzels having different sizes ann shapes.

A further object of the present invention is to provide an automated apparatus in which the operation can be varied from pretzel to pretzel to provide a unique appearing product similar to that which occurs when the pretzels are made by hand.

These and other objectives are satisfied by an apparatus which comprises a conveyor system that has a surface for receiving and transporting a rope of dough. An anvil is moveable with respect to the conveyor to engage the rope of dough which becomes bent about the anvil by continued movement of the conveyor surface to form a curved portion of dough. A twister head is movable along the conveyor with the dough and includes an effector for grabbing two ends of the rope of dough. The twister head is rotatable to form a twisted section of the rope of dough adjacent the two ends. A mechanism is provided to press the two ends against the curved portion to complete the formation of a twisted pretzel.

The location of and degree to which the ends are pressed against the curved portion can be varied randomly among a plurality of pretzels being manufactured. Due to this random variation, the pretzels do not have identical appearances as typically results from machine made products. Instead, the pretzels vary in appearance so that they resemble handmade products.

DETAILED DESCRIPTION OF THE INVENTION

Figure 1:
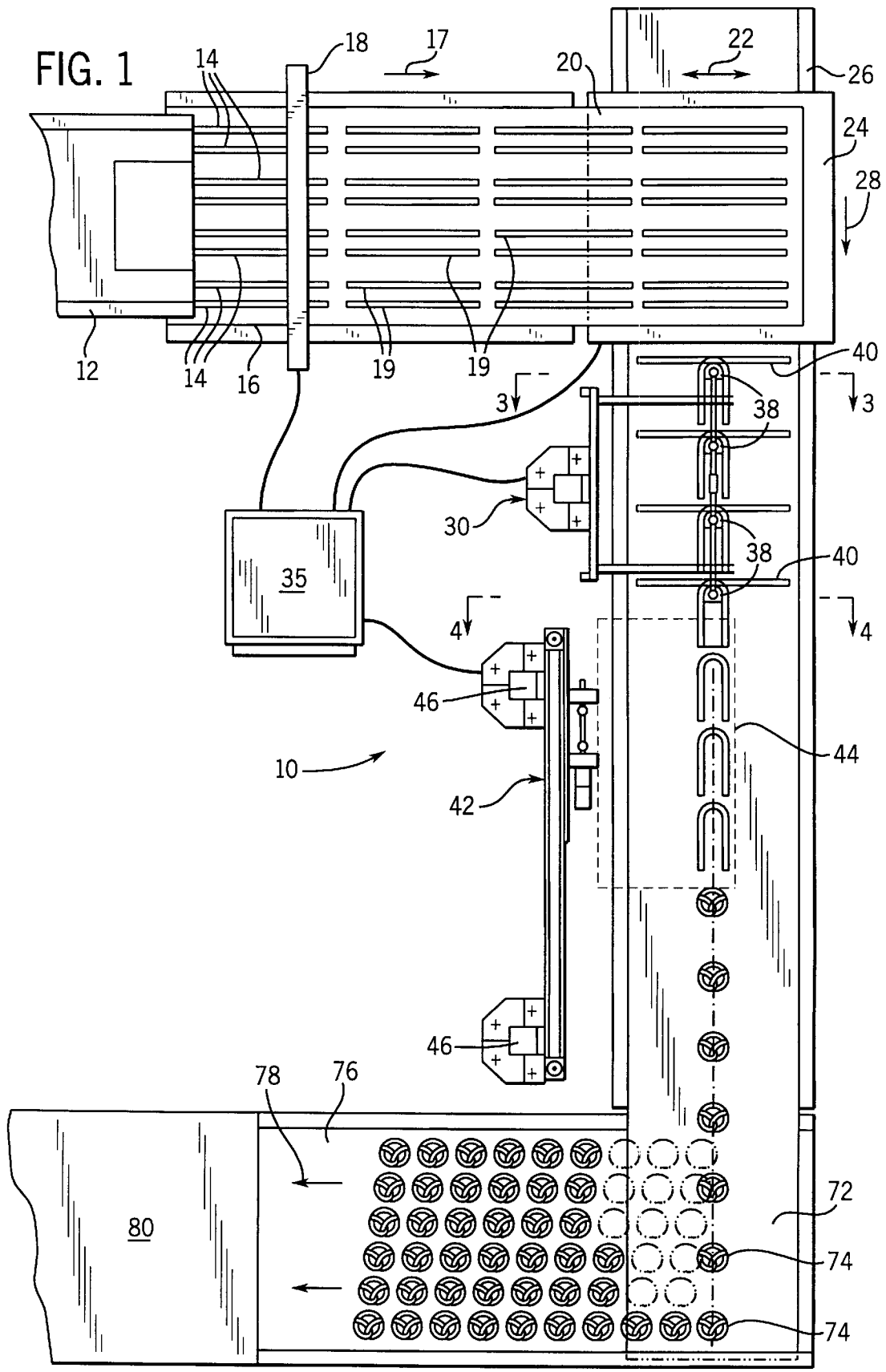
FIG. 1 is a top view of an automated assembly line for manufacturing twisted pretzels.

With initial reference to FIG. 1, an apparatus 10 for manufacturing twisted pretzels comprises an extruder, or laminator 12, which produces eight continuous strands 14 of pretzel dough, for example. The strands of dough 14 drop lengthwise in parallel onto a first conveyor 16 which moves in a direction indicated by arrow 17. A cutter 18 passes across the first conveyor 16 and severs the continuous strands of dough into ropes of dough 19 having the appropriate length for the size of pretzel being produced.

The ropes of dough 19 continue along the first conveyor 16 ultimately reaching the remote end which terminates in a shuttle conveyor 20. As is well known in the art, shuttle conveyors retract and extend along directions indicated by double arrow 22. The shuttle conveyor 20 extends over a metering tray 24 which is mounted above one end of a second conveyor 26 that is oriented orthogonally to the first conveyor 16 and moves in a direction indicated by arrow 28.

The shuttle conveyor 20 oscillates back and forth along directions 22 so that the cut ropes of dough 19 drop into troughs of the metering tray 24. Each trough in the metering tray 24 has a trap door through which its dough rope can drop onto the second conveyor 26. First, every other trap door is opened to drop four of the ropes of dough 19 onto the second conveyor 26. This action arranges the four dough ropes transversely across the second conveyor. Once those four ropes have passed from beneath the tray 24, the remaining four ropes of dough are dropped from the tray onto the second conveyor.

Figure 3:
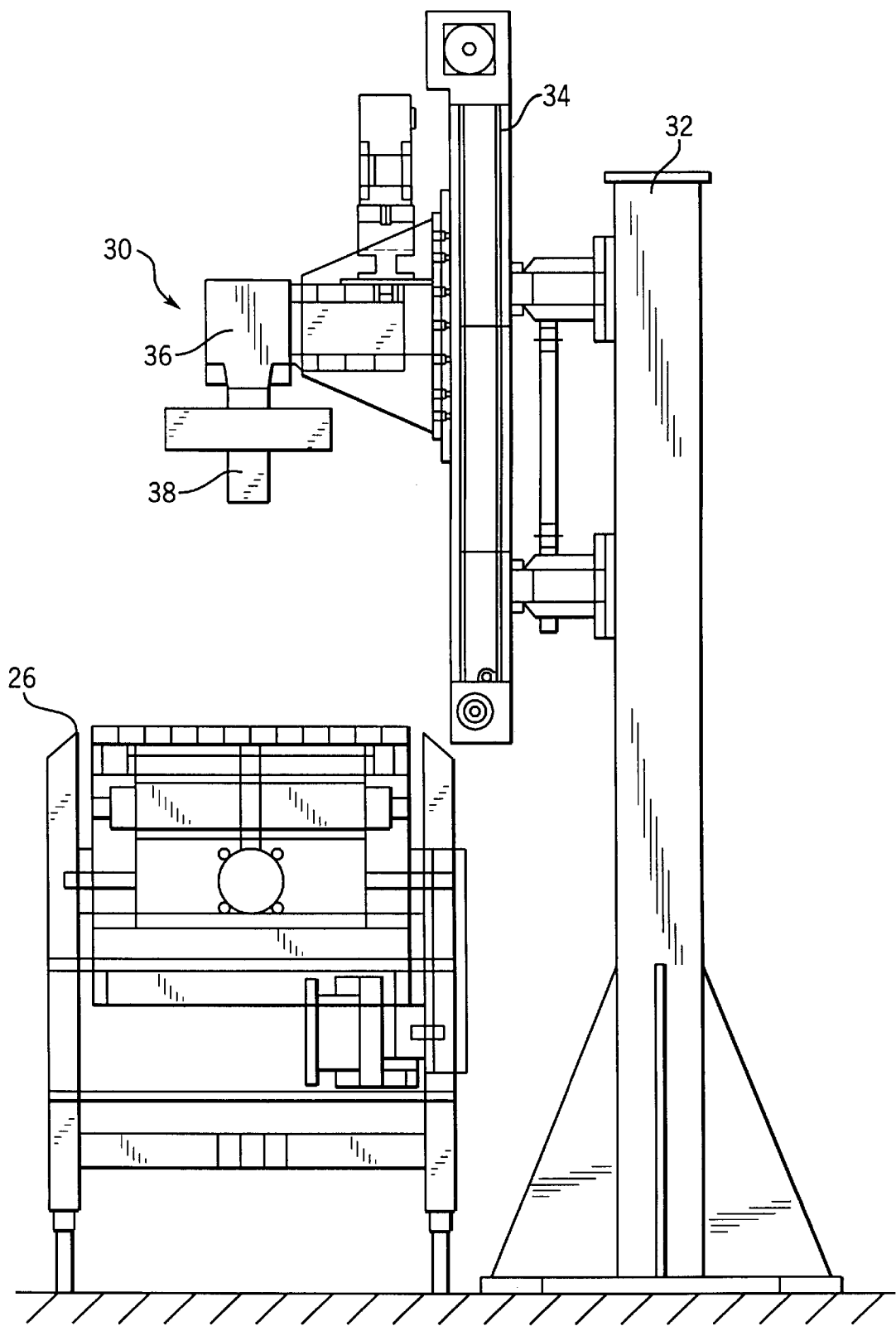
FIG. 3 is a cross sectional view taken along line 3—3 in FIG. 1.

Ultimately the second conveyor 26 moves four of the dough rope beneath a bending assembly. As shown in FIG. 3, the bending mechanism comprises support pillar 32 on which an elevator 34 is mounted to raise and lower an anvil assembly 36 with respect to the surface of the second conveyor 26. The anvil assembly 36 has four anvils 38. Each anvil depends from the assembly 36 and has a curved surface facing toward the tray 24. Initially, four dough ropes 40 are arranged in straight lines across the width of the conveyor 26 upon reaching the bending mechanism 30. A proximity sensor (not shown) located on the bending mechanism 30 detects when one of the dough ropes 40 is between each of the anvils 38, and a controller 35 for the apparatus 10 responds by activating the elevator 34 to lower the anvils against the surface of the conveyor 36. Further movement of the second conveyor 26 along direction 28 pushes the linear dough ropes 40 against the curved surface of each anvil 38. Thereafter, further movement of the second conveyor 26 causes the ends of the dough ropes 40 to bend around the stationary anvils 38 until each dough rope assumes a U-shape, as shown in FIG. 1. This orientation of the dough ropes is detected by another proximity sensor which causes the elevator 34 to raise the anvils 38 away from the surface of the second conveyor 26, thus releasing the now U-shaped dough ropes 40 to travel farther along the second conveyor.

Eventually the group of four U-shaped ropes 40 pretzel dough travels under the head 44 of a twister mechanism 42 where the head is indicated in phantom in FIG. 1 so that the dough ropes 40 will be visible. The twisting mechanism 42 is shown in detail in FIGS. 2 and 4 and comprises two support pillars 46 which are spaced apart along the one side of the second conveyor 26. Two horizontal rails 48 extend between the pair of support pillars 46 with a pair of vertical rails 50 slidably mounted on the horizontal rails. A first motor 52 drives separate chains or belts which extend the length of each horizontal rail 48 and are linked to move the vertical rails 50 horizontally along the second conveyor 26. Another motor 54 drives a pair of chains or belts that extend the length of each vertical rail 50 to raise or lower the twister head 44 that is mounted there. This assembly of rails and drive mechanisms form a Cartesian robot that moves the twister head 44 along the length of the second conveyor 26 and vertically in relation thereto.

Figure 2:
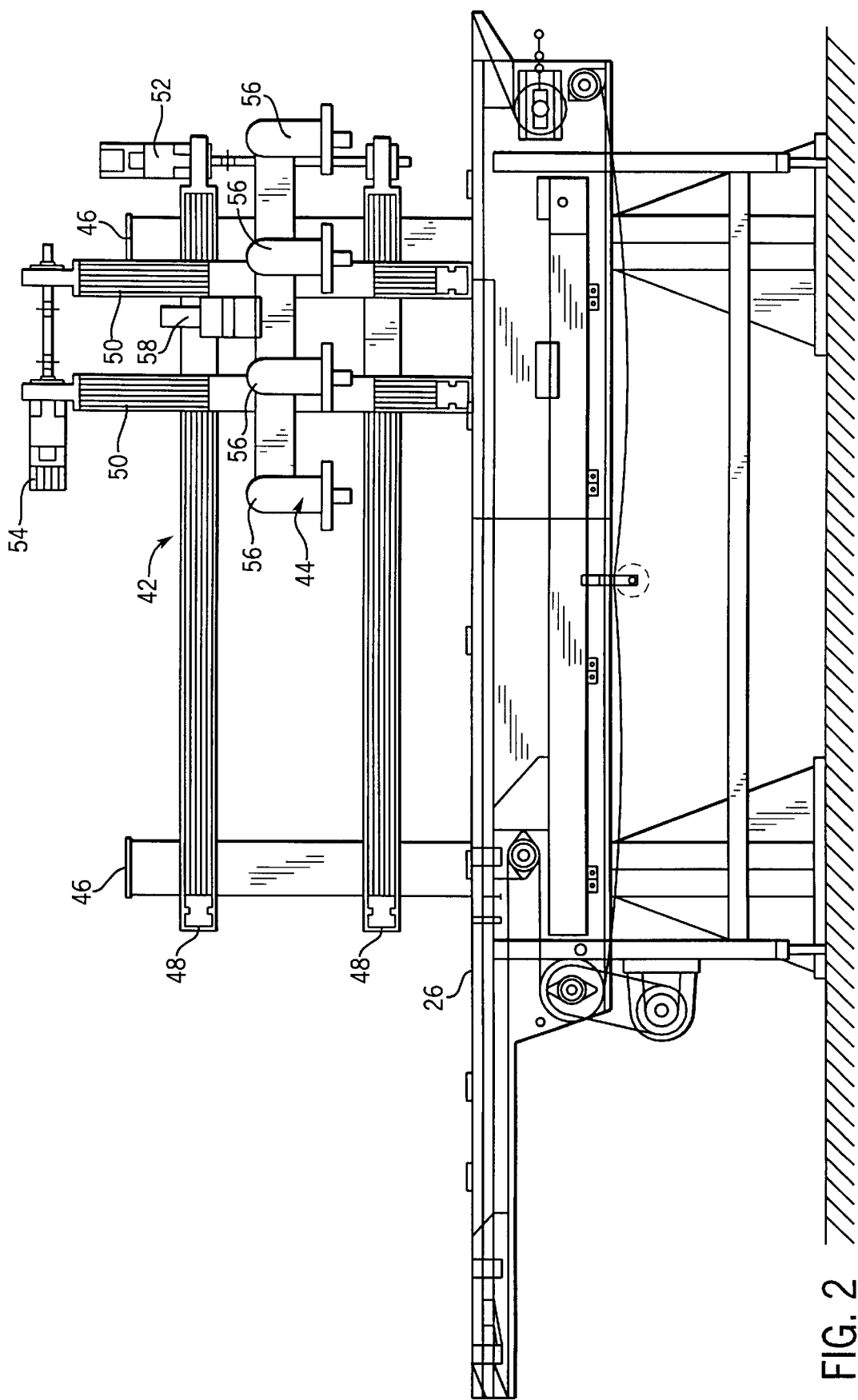
FIG. 2 is a side elevation view of the portion of the assembly line for twisting the pretzels.
Figure 4:
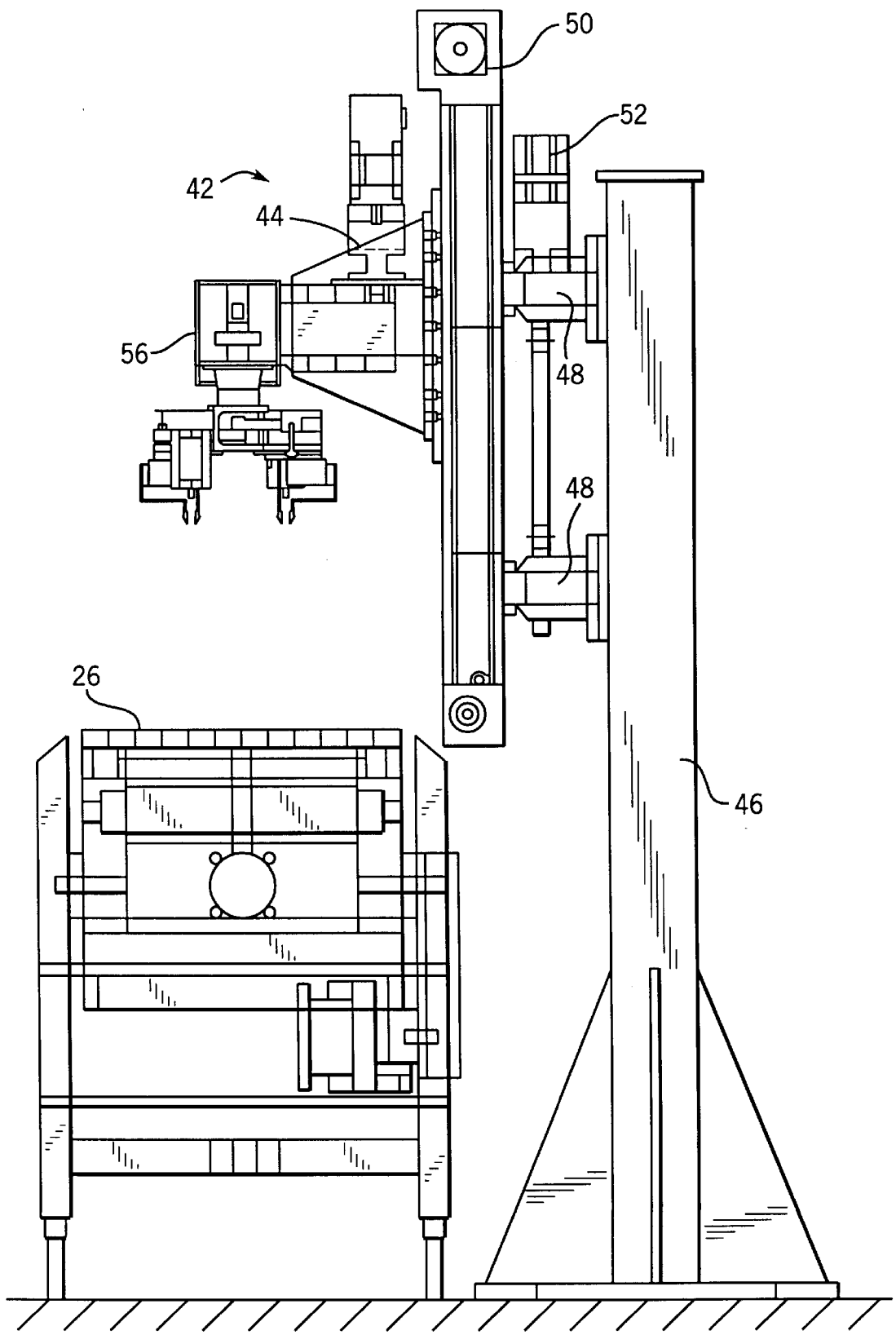
FIG. 4 is a cross sectional view taken along line 4—4 of FIG. 1.
Figure 5:
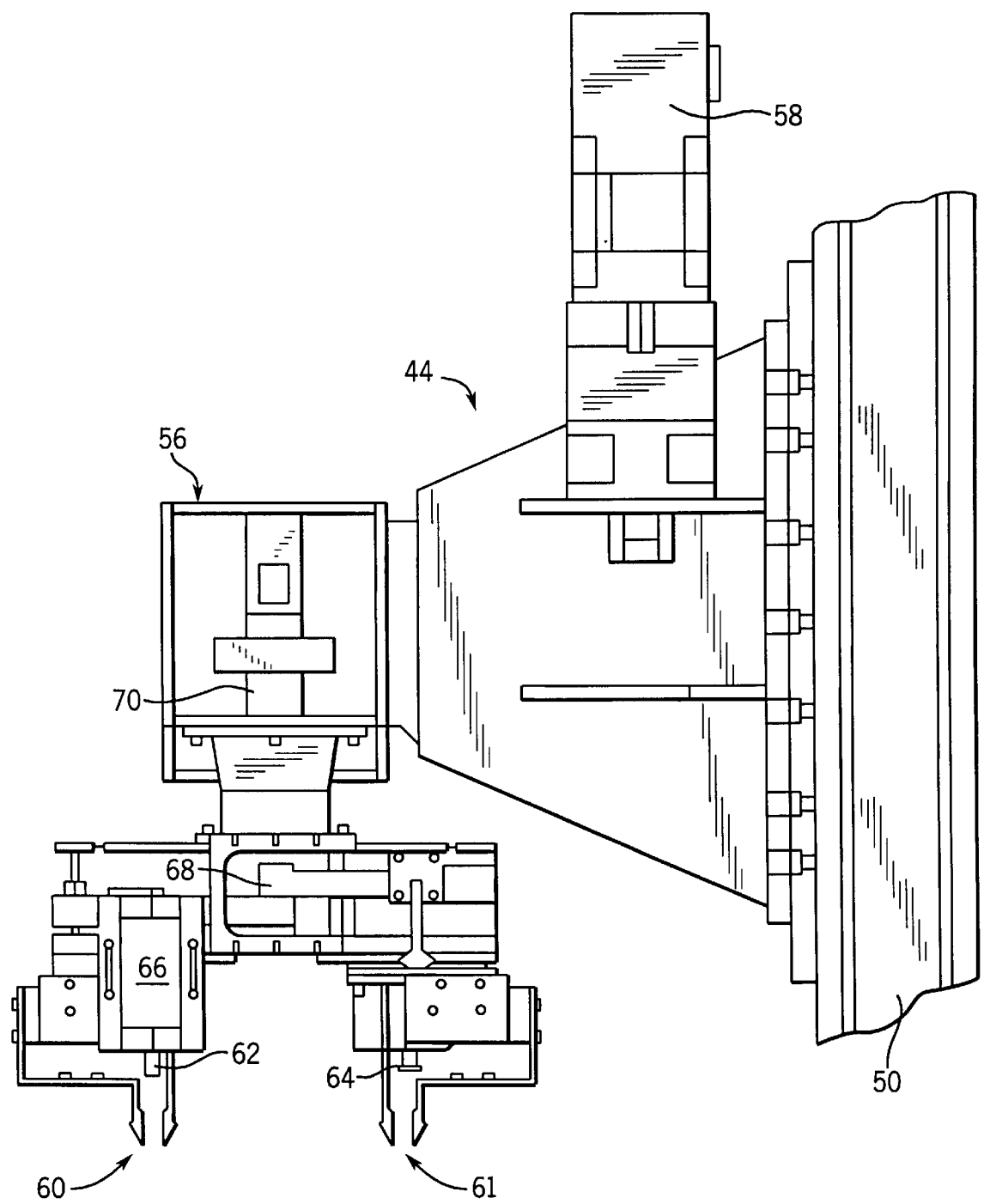
FIG. 5 is a side view of an assembly for twisting a rope of dough moving down the assembly line.

The head 44 of the twister mechanism 42 comprises four twisting units 56 spaced along the longitudinal axis over the second conveyor 26 as shown in FIGS. 2 and 4. Referring to FIG. 5, the twisting units 56 are driven in unison by a motor 58. Each twister unit 56 comprises an effector formed by two pairs of opposing fingers 60 and 61 which move together or apart to grasp ends of the dough ropes 40, as will be described. The two pairs of fingers 60 and 61 are spaced apart by an amount equal to the distance between the ends of the U-shaped dough ropes on the second conveyor 26. Above each pair of fingers 60 and 61 is a separate plunger 62 or 64, respectively, which is driven by an actuator 66 (with only one such actuator being visible in FIG. 5). The pairs of opposing fingers are operated by clutch assemblies connected to a series of belts and pulleys 68 which are linked by additional belts, pulleys and shafts to the twister motor 58.

With reference again to FIGS. 1 and 2, the twister mechanism 42 is initially in a rest position with the twisting units 56 located at the end of the horizontal rails 48 closest to the bending mechanism 30. A proximity sensor (not showing) detects the presence of four U-shaped dough ropes 40 under the twister head 44. This detection causes the controller 35 to activate the twister mechanism which begins traveling horizontally along the conveyor 26 in synchronism with the ropes of dough 40. At the same time, the four twisting units 56 are lowered until an end of a dough rope is between each pairs of opposing fingers 60 and 61. Those fingers then close to grasp the ends of the dough ropes and then lift those ends above the surface of the conveyor 26.

A clutch mechanism 70 within each of the twister units 56 then engages to produce a 360° rotation of the pairs of opposed fingers 60 and 61 which produces a twisted segment of each dough rope 40. While the operation occurs the twisting heads 44 continue to move along the conveyor 26 at the same rate as the dough ropes. After the twisted rope segments have been formed, motor 52 slows the horizontal movement of the twister head 44 with respect to the rate of the conveyor 26 causing the curved portion of what was previously the U-shaped dough rope 40 to pass beneath the pairs of fingers 60 and 61 which still grasp the rope ends. This causes the twisted segment to be folded over the top of the curved portion of the dough rope. While this folding is occurs, the twisting unit 56 is lowered so that the ends of the dough rope come into contact with the curved portion.

Next the two pairs of opposed fingers 60 and 61 open and the plungers 62 and 64 are lowered to press the ends of the dough firmly into the curved portion thereby completing the finished pretzel shape. This plunger action depresses the ends of the dough rope in much the same way as depressions were produced by fingers when pretzels are made by hand.

The depth and location of the depressions can be varied randomly so that the pretzels are not uniform, thereby giving the appearance of handmade pretzels. Specifically, the amount to which the ends of the pretzel rope are twisted and the exact location at which the ends are pressed against the curved portion are varied randomly from pretzel to pretzel by the assembly line controller 35 governing the amount of twister head rotation. Thus, sometimes the ends of the dough rope are centered about the curved portion while other times one or the other of the ends is placed closer to the mid point of the curve which providing a variation among the pretzels that resembles the non-uniformity of handmade products.

Once the ends have been pressed onto the curved portion, the twister head assembly 44 is raised above the surface of the second conveyor 26 and returned horizontally to the rest position illustrated in FIG. 2.

With continuing reference to FIG. 1, the group of four twisted pretzels continues to pass along the second conveyor 26 reaching the remote end at which another shuttle conveyor 72 is located. This shuttle conveyor 72 slowly retracts dropping each of the twisted pretzels 74 on to a third conveyor 76 positioned orthogonally to the second conveyor 26. This action produces rows of pretzels extending across the width of the third conveyor 76 which carries the pretzels in a direction 78 into a conventional oven 80.

I claim:

1. An apparatus for manufacturing twisted pretzels in which the apparatus comprises:

a conveyor system having a surface for receiving and transporting a rope of dough which has two ends;

bending assembly having an anvil that bends the rope of dough to form a curved portion;

a twister assembly having a twister head that is movable along the conveyor, the twister including an effector for grabbing the two ends of the rope of dough and being rotatable to form a twisted section of the rope of dough adjacent the two ends, the twister assembly further including a mechanism for pressing the two ends against the curved portion following formation of the twisted section to form a twisted pretzel.

2. The apparatus as recited in claim 1 further comprising a controller which operates the twister assembly and varies positions along the curved portion at which the ends are pressed in order that a plurality of pretzels differ in appearance.

3. The apparatus as recited in claim 1 wherein the anvil is movable with respect to the surface of the conveyor into a first position at which the anvil engages the rope of dough so that further movement of the conveyor bends the rope of dough about the anvil, and a second position at which the rope of dough is able to pass along the conveyor unimpeded by the anvil.

4. The apparatus as recited in claim 3 wherein the bending assembly includes a driver that moves the anvil up and down with respect to the surface of the conveyor system.

5. The apparatus as recited in claim 1 wherein the bending assembly has a plurality of anvils that move in unison to simultaneously bend a like plurality of ropes of dough.

6. The apparatus as recited in claim 1 wherein the twisting assembly comprises a plurality of twister heads that simultaneously process a like plurality of ropes of dough.

7. The apparatus as recited in claim 1 wherein the twisting assembly includes a Cartesian robot that moves the twister head along two orthogonal axes with respect to the surface of the conveyor.

8. The apparatus as recited in claim 1 wherein the effector comprises two pairs of opposed fingers with each pair being movable for grabbing a different end of the rope of dough.

9. The apparatus as recited in claim 8 wherein the mechanism for pressing comprises a pair of plungers each associated with a different one of the pairs of opposed fingers.

10. The apparatus as recited in claim 1 wherein the mechanism for pressing imparts a depression into each of the two ends which resemble an imprint left by human fingers in a handmade pretzel.

11. The apparatus as recited in claim 1 wherein the mechanism for pressing varies a depth of the depression among a plurality of pretzels so that each pretzel has a different appearance.

12. The apparatus as recited in claim 1 wherein the mechanism for pressing varies a location of the depression among a plurality of pretzels so that each pretzel has a different appearance.

13. The apparatus as recited in claim 1 wherein the conveyor system comprises:

a first conveyor which receives a plurality of continuous strands of dough;

a cutter which severs the continuous strands of dough into the ropes of dough which have a predefined length; and a second conveyor having the surface which moves in a first direction onto which the ropes of dough are transferred from the first conveyor and arranged transversely to the first direction.

14. The apparatus as recited in claim 13 wherein the first conveyor includes a shuttle conveyor that transfers the ropes of dough onto the second conveyor.

15. The apparatus as recited in claim 13 further comprising a third conveyor which receives the twisted pretzel from the second conveyor and transports the twisted pretzel to an oven.

\* \* \* \* \*